US009528855B2

United States Patent
Houda

(10) Patent No.: US 9,528,855 B2
(45) Date of Patent: Dec. 27, 2016

(54) MULTI-TURN ABSOLUTE ROTATION ANGLE DETECTION DEVICE AND METHOD OF DETECTING ABSOLUTE ROTATION ANGLE

(71) Applicant: ORIENTAL MOTOR CO., LTD., Tokyo (JP)

(72) Inventor: Akihiko Houda, Ibaraki (JP)

(73) Assignee: Oriental Motor Co., Ltd., Tokyo (JP)

( * ) Notice: Subject to any disclaimer, the term of this patent is extended or adjusted under 35 U.S.C. 154(b) by 0 days.

(21) Appl. No.: 13/261,897

(22) PCT Filed: Oct. 9, 2012

(86) PCT No.: PCT/JP2012/076093
§ 371 (c)(1),
(2) Date: May 14, 2014

(87) PCT Pub. No.: WO2013/073319
PCT Pub. Date: May 23, 2013

(65) Prior Publication Data
US 2014/0290079 A1    Oct. 2, 2014

(30) Foreign Application Priority Data
Nov. 14, 2011    (JP) .................................. 2011-248663

(51) Int. Cl.
*G01D 5/12*    (2006.01)
*G01D 5/245*    (2006.01)

(52) U.S. Cl.
CPC .............. *G01D 5/12* (2013.01); *G01D 5/2452* (2013.01)

(58) Field of Classification Search
CPC .......... G01D 5/12; G01D 5/3473; G01D 5/26; G06F 7/483; G01B 7/30
(Continued)

(56) References Cited

U.S. PATENT DOCUMENTS

| 4,339,950 A * | 7/1982 | Lendino .................. G01F 23/42 235/61 M |
| 4,572,951 A | 2/1986 | Toda et al. |

(Continued)

FOREIGN PATENT DOCUMENTS

| JP | 58-106691 | 6/1983 |
| JP | 59-190612 | 10/1984 |

(Continued)

OTHER PUBLICATIONS

ISR & Written Opinion from corresponding Int'l Application No. PCT/JP2012/076093 Dec. 11, 2012.
(Continued)

*Primary Examiner* — Christopher Fulton
(74) *Attorney, Agent, or Firm* — Bryan Cave LLP

(57) ABSTRACT

This detection device is configured from a gear mechanism (1) provided with first to third counter-shaft gears that mesh with a main-shaft gear (10b), and has a relationship in which the difference between the numbers of teeth of the main-shaft gear and the first counter-shaft gear is two or an integer (a) exceeding two, the difference between the numbers of teeth of the main-shaft gear and the second counter-shaft gear is one, and the number of teeth of the first counter-shaft gear is an integral multiple of the product of the difference of the number of teeth thereof from that of the main-shaft gear and the shaft angle multiplier of a main shaft detector. The detected values of angle detectors (RS0-RS3) are given as digitized angle detected values ($P_{0(4X)}$, $P_{1(1X)}$, $P_{2(1X)}$, $P_{3(1X)}$) to a multi-turn arithmetic circuit (25). The determination region of the detected value ($P_{0(4X)}$) of a main shaft is determined, and the rotation angle of the main shaft is found. Further, periodic signal values indicating the differences in rotation angle between the main shaft and first to third counter shafts are generated, respectively, and on the basis of a combination of the relative numbers of rotations (Continued)

of the first to third counter shafts found from the respective periodic signal values, the number of rotations of the main shaft is found. The multi-turn absolute rotation angle can be obtained by adding the rotation angle to the number of rotations of the main shaft.

20 Claims, 8 Drawing Sheets

(58) Field of Classification Search
USPC .......................................... 33/1 PT; 702/151
See application file for complete search history.

(56) References Cited

U.S. PATENT DOCUMENTS

| | | | | |
|---|---|---|---|---|
| 4,997,414 | A * | 3/1991 | Camara | B63H 5/10 |
| | | | | 475/330 |
| 5,403,245 | A | 4/1995 | Watanabe | |
| 5,457,371 | A | 10/1995 | Gordon | |
| 5,930,905 | A * | 8/1999 | Zabler | G01D 5/04 |
| | | | | 33/1 PT |
| 5,950,052 | A | 9/1999 | Nomura | |
| 6,026,925 | A | 2/2000 | Nagao | |
| 6,507,188 | B1 * | 1/2003 | Dilger | B62D 15/02 |
| | | | | 324/207.21 |
| 6,892,588 | B2 | 5/2005 | Nagase | |
| 6,941,241 | B2 * | 9/2005 | Lee | G01D 5/2452 |
| | | | | 702/151 |
| 7,040,025 | B2 * | 5/2006 | Inoue | G01D 5/04 |
| | | | | 33/1 PT |
| 7,307,415 | B2 | 12/2007 | Seger | |
| 7,637,020 | B2 * | 12/2009 | Maier | G01D 5/145 |
| | | | | 33/1 PT |
| 7,775,129 | B2 | 8/2010 | Oike | |
| 7,854,680 | B2 | 12/2010 | Sugai | |
| 8,378,666 | B2 | 2/2013 | Putinier | |
| 8,493,572 | B2 | 7/2013 | Milvich | |
| 2004/0020309 | A1 | 2/2004 | Nagase | |
| 2006/0042074 | A1 | 3/2006 | Stork | |
| 2008/0188346 | A1 | 8/2008 | Sugai | |
| 2009/0257074 | A1 | 10/2009 | Kazama | |
| 2010/0114524 | A1 * | 5/2010 | Saito | B62D 15/0215 |
| | | | | 702/151 |
| 2010/0235054 | A1 * | 9/2010 | Hoskins | B62D 15/0215 |
| | | | | 701/42 |
| 2013/0147469 | A1 * | 6/2013 | Noda | G01B 7/30 |
| | | | | 324/207.25 |
| 2013/0289936 | A1 | 10/2013 | Houda | |
| 2014/0005976 | A1 * | 1/2014 | Platzer | G01B 21/22 |
| | | | | 702/151 |
| 2014/0172932 | A1 | 6/2014 | Houda | |

FOREIGN PATENT DOCUMENTS

| | | |
|---|---|---|
| JP | 60-239608 | 11/1985 |
| JP | 60-239618 | 11/1985 |
| JP | 61-017913 | 1/1986 |
| JP | 63-242028 | 10/1988 |
| JP | 4-21813 | 2/1992 |
| JP | 05-038243 | 2/1993 |
| JP | 04-212017 | 8/1995 |
| JP | 2002-107178 | 4/2002 |
| JP | 2003-344110 | 12/2003 |
| JP | 2004-138606 | 5/2004 |
| JP | 3665732 | 6/2005 |
| JP | 2008-039737 | 2/2008 |
| JP | 2008-265414 | 11/2008 |
| JP | 2009-229396 | 10/2009 |
| JP | 2010-044055 | 2/2010 |

OTHER PUBLICATIONS

ISR & Written Opinion from Int'l Application No. PCT/JP2012/066490 Sep. 11, 2012.

Hayashi, Y., et al., "Development of High Resolution and Compact Absolute Rotary Encoder with Batteryless Multi-turn Detecting Function," Journal of the Japan Society of Precision Engineering, 2000, vol. 66, No. 8, pp. 1177-1180; for relevance, see the specification of U.S. Appl. No. 13/978,375, Paragraphs [0008] and [0009], as originally amended.

ISR & Written Opinion from Int'l Application No. PCT/JP2012/050160 Mar. 12, 2012.

* cited by examiner

| ROTATION COUNT OF MAIN SHAFT (n) | ROTATION COUNT DIFFERENCE OF FIRST COUNTER-SHAFT (m1) | ROTATION COUNT DIFFERENCE OF FIRST COUNTER-SHAFT (m2) | ROTATION COUNT DIFFERENCE OF THIRD COUNTER-SHAFT (m3) | ROTATION COUNT OF MAIN SHAFT (n) | ROTATION COUNT DIFFERENCE OF FIRST COUNTER-SHAFT (m1) | ROTATION COUNT DIFFERENCE OF FIRST COUNTER-SHAFT (m2) | ROTATION COUNT DIFFERENCE OF THIRD COUNTER-SHAFT (m3) |
|---|---|---|---|---|---|---|---|
| 0 | 0 | 0 | 0 | 215 | 7 | 26 | 12 |
| 1 | 1 | 1 | 1 | 216 | 0 | 0 | 13 |
| 2 | 2 | 2 | 2 | 217 | 1 | 1 | 14 |
| 3 | 3 | 3 | 3 | 218 | 2 | 2 | 15 |
| 4 | 4 | 4 | 4 | 219 | 3 | 3 | 16 |
| 5 | 5 | 5 | 5 | : | : | : | : |
| 6 | 6 | 6 | 6 | 6221 | 5 | 11 | 15 |
| 7 | 7 | 7 | 7 | 6222 | 6 | 12 | 16 |
| 8 | 0 | 8 | 8 | 6223 | 7 | 13 | 17 |
| 9 | 1 | 9 | 9 | 6224 | 0 | 14 | 18 |
| 10 | 2 | 10 | 10 | 6225 | 1 | 15 | 19 |
| 11 | 3 | 11 | 11 | 6226 | 2 | 16 | 20 |
| 12 | 4 | 12 | 12 | 6227 | 3 | 17 | 21 |
| 13 | 5 | 13 | 13 | 6228 | 4 | 18 | 22 |
| 14 | 6 | 14 | 14 | 6229 | 5 | 19 | 23 |
| 15 | 7 | 15 | 15 | 6230 | 6 | 20 | 24 |
| 16 | 0 | 16 | 16 | 6231 | 7 | 21 | 25 |
| 17 | 1 | 17 | 17 | 6232 | 0 | 22 | 26 |
| 18 | 2 | 18 | 18 | 6233 | 1 | 23 | 27 |
| 19 | 3 | 19 | 19 | 6234 | 2 | 24 | 28 |
| 20 | 4 | 20 | 20 | 6235 | 3 | 25 | 0 |
| 21 | 5 | 21 | 21 | 6236 | 4 | 26 | 1 |
| 22 | 6 | 22 | 22 | 6237 | 5 | 0 | 2 |
| 23 | 7 | 23 | 23 | 6238 | 6 | 1 | 3 |
| 24 | 0 | 24 | 24 | 6239 | 7 | 2 | 4 |
| 25 | 1 | 25 | 25 | 6240 | 0 | 3 | 5 |
| 26 | 2 | 26 | 26 | 6241 | 1 | 4 | 6 |
| 27 | 3 | 0 | 27 | 6242 | 2 | 5 | 7 |
| 28 | 4 | 1 | 28 | 6243 | 3 | 6 | 8 |
| 29 | 5 | 2 | 0 | 6244 | 4 | 7 | 9 |
| 30 | 6 | 3 | 1 | 6245 | 5 | 8 | 10 |
| 31 | 7 | 4 | 2 | 6246 | 6 | 9 | 11 |
| 32 | 0 | 5 | 3 | 6247 | 7 | 10 | 12 |
| 33 | 1 | 6 | 4 | 6248 | 0 | 11 | 13 |
| 34 | 2 | 7 | 5 | 6249 | 1 | 12 | 14 |
| 35 | 3 | 8 | 6 | 6250 | 2 | 13 | 15 |
| 36 | 4 | 9 | 7 | 6251 | 3 | 14 | 16 |
| 37 | 5 | 10 | 8 | 6252 | 4 | 15 | 17 |
| 38 | 6 | 11 | 9 | 6253 | 5 | 16 | 18 |
| 39 | 7 | 12 | 10 | 6254 | 6 | 17 | 19 |
| 40 | 0 | 13 | 11 | 6255 | 7 | 18 | 20 |
| 41 | 1 | 14 | 12 | 6256 | 0 | 19 | 21 |
| 42 | 2 | 15 | 13 | 6257 | 1 | 20 | 22 |
| : | : | : | : | 6258 | 2 | 21 | 23 |
| 209 | 1 | 20 | 6 | 6259 | 3 | 22 | 24 |
| 210 | 2 | 21 | 7 | 6260 | 4 | 23 | 25 |
| 211 | 3 | 22 | 8 | 6261 | 5 | 24 | 26 |
| 212 | 4 | 23 | 9 | 6262 | 6 | 25 | 27 |
| 213 | 5 | 24 | 10 | 6263 | 7 | 26 | 28 |

Fig. 7

MULTI-TURN ABSOLUTE ROTATION ANGLE DETECTION DEVICE AND METHOD OF DETECTING ABSOLUTE ROTATION ANGLE

CROSS-REFERENCE TO RELATED APPLICATIONS

This application is a national stage application under 35 U.S.C. 371 of and claims priority to International Application No. PCT/JP2012/076093, filed Oct. 9, 2012. International Application No. PCT/JP2012/076093 claims priority to Japanese Application No. P2011-248663, filed Nov. 14, 2011, which has since issued as Japanese Patent No. 5420624 on Nov. 29, 2013. Both International Application No. PCT/JP2012/076093 and Japanese Application No. P2011-248663 are incorporated herein by reference.

TECHNICAL FIELD OF THE INVENTION

The present invention relates to an apparatus and method for detecting a multi-turn absolute rotation angle, and more particularly, to an apparatus and method for detecting a multi-turn absolute rotation angle by detecting angles within one rotation of plural rotating shafts differing in transmission gear ratio.

DESCRIPTION OF THE BACKGROUND

It is necessary to control axial rotation of a rotational drive source such as a motor over multiple rotations in order to control positions of machine tools or mobile bodies such as robots. In particular, it is extremely important to detect angles within one rotation at high resolution and obtain angle information over a larger number of rotations. However, a large number of rotation angle detection apparatus with increased resolution as well as with angle information for an increased number of rotations have been proposed conventionally.

To deal with the problems of increases in the number of angle detectors, complication of a gear mechanism, and increases in the size of the gear mechanism when using two angle detectors differing in a shaft angle multiplier for angle detection of one axis in order to increase detection resolution within one rotation and increase a multi-turn detection range, an absolute position detection method disclosed in Japanese Patent No. 3665732 proposes a method which quadruples the resolution without decreasing the multi-turn detection range and without increasing the number of resolvers by using a 4-fold angle resolver for a first axis and a 1-fold angle resolver for a second axis.

RELATED ART DOCUMENT

Patent References

Patent Literature 1: Japanese Patent No. 3665732
Patent Literature 2: Japanese Patent Publication No. JP2009-229396A

BRIEF DESCRIPTION OF DRAWINGS

FIG. 7 is a table showing a relationship between the rotation count of the main shaft and relative rotation count of each counter-shaft, according to the embodiment of FIG. 1.

DETAILED DESCRIPTION OF EXAMPLES OF EMBODIMENTS

Conventional detection methods have a problem in that particular accuracy is required of the first-stage absolute position detector (resolver) RS1, which is used for both region discrimination within one rotation and the number of rotations as described in Paragraph [0006] of Patent Literature 2. That is, the region discrimination within one rotation and discrimination of the number of rotations described in Patent Literature 1 are performed based on waveforms shown in FIG. 5, and θ10 given by Eq. (3) can be used for determination of an absolute position (a machine angle) within one rotation (see Paragraph [0022]), but a calculation result of θ10 is used to discriminate 26 rotations×4 regions, requiring an accuracy which supports 104 (26×4) divisions. In contrast, θ20 in FIG. 6 requires only an accuracy of 27 divisions and θ30 in FIG. 7 requires only an accuracy of 29 divisions.

In the configuration according to Patent Literature 1, three 1-fold angle resolvers RS1, RS2, and RS3 are used, and nearly four times higher accuracy is required of one resolver than the other resolvers. Thus, either a high-accuracy resolver is used only for RS1 or resolvers with equal accuracy are used for RS1, RS2, and RS3 by applying a narrowed detection range to RS2 and RS3 instead of using rotation cycles originally expected of RS2 and RS3. It is difficult in many cases to use a particularly high-accuracy angle detector only for RS1 due to limitations of installation space or due to design or manufacturing constraints. Also, from the perspective of standardizing parts, it is preferable in many cases to use 1-fold angle resolvers with equal accuracy for RS1 to RS3.

Patent Literature 2 discloses an encoder having four angle detection axes as with Patent Literature 1, wherein a gear G0 and a gear G1 are connected at a gear ratio of one to one and a 1-fold angle detector for the gear G1 is used only for region discrimination of a 4-fold angle detector for the gear G0. Whereas Patent Literature 1 obtains a detection range of 20,368 rotations from three signals of a 26-rotation cycle, 27-rotation cycle, and 29-rotation cycle, Patent Literature 2 mechanically obtains a detection range of only 783 rotations from 27 rotations per cycle and 29 rotations per cycle.

Figure 5:
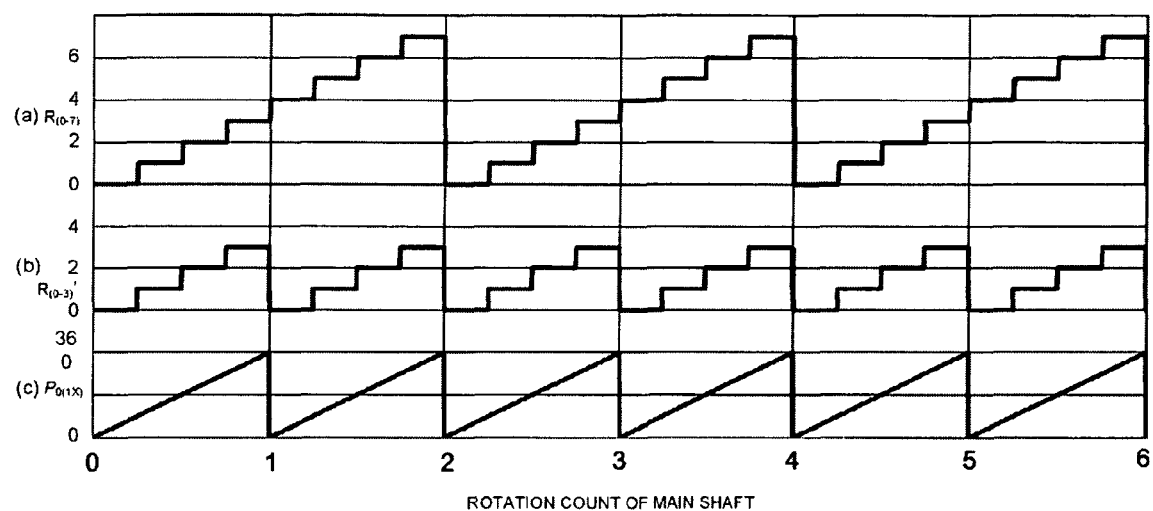
FIG. 5 is a diagram showing signal waveforms used to determine a rotation angle within one rotation of the main shaft, according to the embodiment of FIG. 1.

The discrimination based on signal waveforms of FIG. 5 according to Patent Literature 1 has a signal processing problem in that signals of 4 cycles per rotation and ½6 cycle per rotation are mixed together, making it troublesome to discriminate between the two signals. Furthermore, the technique according to Patent Literature 1 finds differences between rotation angles of three counter-shafts coupled at different transmission gear ratios and a rotation angle of a main shaft and thereby obtains three rotation cycle signals and thus multi-turn information. A difference in the number of gear teeth between the main shaft and counter-shafts is 1. If the difference in the number of gear teeth is 1, two shafts with a teeth number difference of +1 or −1 can be coupled to the main shaft, but another gear needs to be installed on the main shaft to couple three or more counter-shafts.

Some embodiments include a multi-turn rotation angle detection apparatus comprising: a main shaft gear mounted on a main shaft; a first counter-shaft gear and second counter-shaft gear adapted to mesh with the main shaft; a first counter-shaft and second counter-shaft adapted to transmit rotations of the first and second counter-shaft gears, respectively; a set of angle detectors including a main shaft angle detector adapted to detect a rotation angle of the main shaft and first and second counter-shaft angle detectors adapted to detect rotation angles of the first and second counter-shafts, where the main shaft angle detector outputs N cycles of an N-fold angle detection value $P_{0(NX)}$ per rotation of the main shaft and the first and second counter-shaft angle detectors output one cycle of 1-fold angle detection values $P_{1(1X)}$ and $P_{2(1X)}$, respectively, per rotation of the respective counter-shafts; and a gear mechanism having a teeth number difference of two or a larger integer a between the first counter-shaft gear and the main shaft gear, and a teeth number difference of 1 between the second counter-shaft gear and the main shaft gear, the number of teeth of the first counter-shaft gear being an integral multiple of a product of the teeth number difference a and a shaft angle multiplier N of the angle detector attached to the main shaft, wherein a multi-turn absolute rotation angle of the main shaft is determined from rotation angle detection values of the main shaft, the first counter-shaft, and the second counter-shaft, the multi-turn rotation angle detection apparatus further comprising main shaft rotation angle detection means adapted to determine a signal $P_{0((aN/M) \times X)}$ one cycle of which corresponds to M/aN rotations of the main shaft from the N-fold angle detection value $P_{0(NX)}$ detected by the main shaft angle detector and the 1-fold angle detection value $P_{1(1X)}$ of the first counter-shaft detected by the first counter-shaft angle detector, M being the number of teeth of the first counter-shaft, obtain a discrimination value which indicates to which cycle of the N cycles the N-fold angle detection value $P_{0(NX)}$ detected by the main shaft angle detector belongs from the signal $P_{0((aN/M) \times X)}$, and synthesize one cycle of a 1-fold angle detection value $P_{0(1X)}$ of the main shaft per rotation of the main shaft from the discrimination value and the N-fold angle detection value $P_{0(NX)}$, and main shaft rotation count detection means adapted to generate a first counter-shaft periodic signal which represents a difference in rotation count between the main shaft and the first counter-shaft, from the 1-fold angle detection value $P_{0(1X)}$ of the main shaft and the 1-fold angle detection value $P_{1(1X)}$ of the first counter-shaft, generate a second counter-shaft periodic signal which represents a difference in rotation count between the main shaft and the second counter-shaft, from the 1-fold angle detection value $P_{0(1X)}$ of the main shaft and the 1-fold angle detection value $P_{2(1X)}$ of the second counter-shaft detected by the second counter-shaft angle detector, and determine the rotation count of the main shaft from the first counter-shaft periodic signal and the second counter-shaft periodic signal.

Also, some embodiments include a multi-turn rotation angle detection apparatus further comprising a third counter-shaft in addition to the first counter-shaft and the second counter-shaft, wherein there is a teeth number difference of 1 between the main shaft gear and the third counter-shaft; a third counter-shaft periodic signal which represents a difference in rotation count between the main shaft and the third counter-shaft is generated from the 1-fold angle detection value $P_{0(1X)}$ of the main shaft and a 1-fold angle detection value $P_{3(1X)}$ of the second counter-shaft detected by the third counter-shaft angle detector; and the main shaft rotation count detection means determines the rotation count of the main shaft from the first counter-shaft periodic signal, the second counter-shaft periodic signal, and the third counter-shaft periodic signal.

Furthermore, some embodiments include a multi-turn rotation angle detection method for a multi-turn rotation angle detection apparatus which comprises a main shaft gear mounted on a main shaft which transmits rotation of a rotational drive source, a first counter-shaft gear and second counter-shaft gear adapted to mesh with the main shaft, a first counter-shaft and second counter-shaft adapted to transmit rotations of the first and second counter-shaft gears, respectively, a set of angle detectors including a main shaft angle detector adapted to detect a rotation angle of the main shaft and first and second counter-shaft angle detectors adapted to detect rotation angles of the first and second counter-shafts, where the main shaft angle detector outputs N cycles of an N-fold angle detection value $P_{0(NX)}$ per rotation of the main shaft and the first and second counter-shaft angle detectors output one cycle of 1-fold angle detection values $P_{1(1X)}$ and $P_{2(1X)}$, respectively, per rotation of the respective counter-shafts, and a gear mechanism having a teeth number difference of two or a larger integer a between the first counter-shaft gear and the main shaft gear, and a teeth number difference of 1 between the second counter-shaft gear and the main shaft gear, the number of teeth of the first counter-shaft gear being an integral multiple of a product of the teeth number difference a and a shaft angle multiplier N of the angle detector attached to the main shaft, wherein a multi-turn absolute rotation angle of the main shaft is determined from rotation angle detection values of the main shaft, the first counter-shaft, and the second counter-shaft, the multi-turn rotation angle detection method comprising a step of detecting N cycles of an N-fold angle detection value $P_{0(NX)}$ per rotation of the main shaft, which is the rotation angle of the main shaft, and detecting one cycle of 1-fold angle detection values $P_{1(1X)}$ and $P_{2(1X)}$ per rotation of the respective counter-shafts, which are the rotation angles of the first and second counter-shafts, respectively; step of determining a signal $P_{0((aN/M) \times X)}$ one cycle of which corresponds to M/aN rotations of the main shaft from the N-fold angle detection value $P_{0(NX)}$ detected by the main shaft angle detector and the 1-fold angle detection value $P_{1(1X)}$ of the first counter-shaft detected by the first counter-shaft angle detector, where M is the number of teeth of the first counter-shaft, obtaining a discrimination value which identifies to which cycle of the N cycles the N-fold angle detection value $P_{0(NX)}$ detected by the main shaft angle detector belongs from the signal $P_{0((aN/M) \times X)}$, and thereby determining a rotation angle within one rotation of the main shaft; and a step of synthesizing one cycle of a 1-fold angle detection value $P_{0(NX)}$ of the main shaft per rotation of the main shaft from the discrimination value and the N-fold angle detection value $P_{0(NX)}$, generating a first counter-shaft periodic signal which represents a difference in rotation count between the main shaft and the first counter-shaft, from the 1-fold angle detection value $P_{0(1X)}$ of the main shaft and the 1-fold angle detection value $P_{1(1X)}$ of the first counter-shaft, generating a second counter-shaft periodic signal which represents a difference in rotation count between the main shaft and the second counter-shaft, from the 1-fold angle detection value $P_{0(1X)}$ of the main shaft and the 1-fold angle detection value $P_{2(1X)}$ of the second counter-shaft detected by the second counter-shaft angle detector, and determining the rotation count of the main shaft from the first counter-shaft periodic signal and the second counter-shaft periodic signal.

Furthermore, some embodiments include a multi-turn rotation angle detection method, wherein: the multi-turn rotation angle detection apparatus further comprises a third counter-shaft in addition to the first counter-shaft and the second counter-shaft; there is a teeth number difference of 1 between the main shaft gear and the third counter-shaft; the multi-turn rotation angle detection method further comprises a step of generating a third counter-shaft periodic signal which represents a difference in rotation count between the main shaft and the third counter-shaft from the 1-fold angle detection value $P_{0(1X)}$ of the main shaft and a 1-fold angle detection value $P_{3(1X)}$ of the second counter-shaft detected by the third counter-shaft angle detector; and the step of determining the rotation count of the main shaft further includes a step of determining the rotation count of the main shaft from the first counter-shaft periodic signal, the second counter-shaft periodic signal, and the third counter-shaft periodic signal.

Some embodiments of the apparatus and related methods can obtain a multi-turn detection range by making full use of the accuracies of individual angle detectors when an N-fold angle detector adopted to output N cycles of a detection signal per rotation is used for the main shaft and 1-fold angle detectors are used for the counter-shafts without requiring the 1-fold angle detector of the first counter-shaft to have particularly high accuracy compared to the 1-fold angle detectors of the second and subsequent counter-shafts to obtain detection resolution within one rotation and even when angle detectors of equal accuracy are used. Also, the apparatus and related methods can make it possible to easily derive region discrimination and the number of rotations in relation to detection values of the main shaft. Furthermore, the apparatus and related methods can allow the number of gears used for the main shaft to be reduced.

A rotation angle detection apparatus according to some embodiments is intended to improve detection resolution of a multi-turn absolute rotation angle and widen a multi-turn detection range. Although the following embodiment will be described assuming that the rotation angle detection apparatus is made up of gears having specific numbers of teeth, the numerical values may be changed without departing from the spirit of the present invention.

Figure 1:
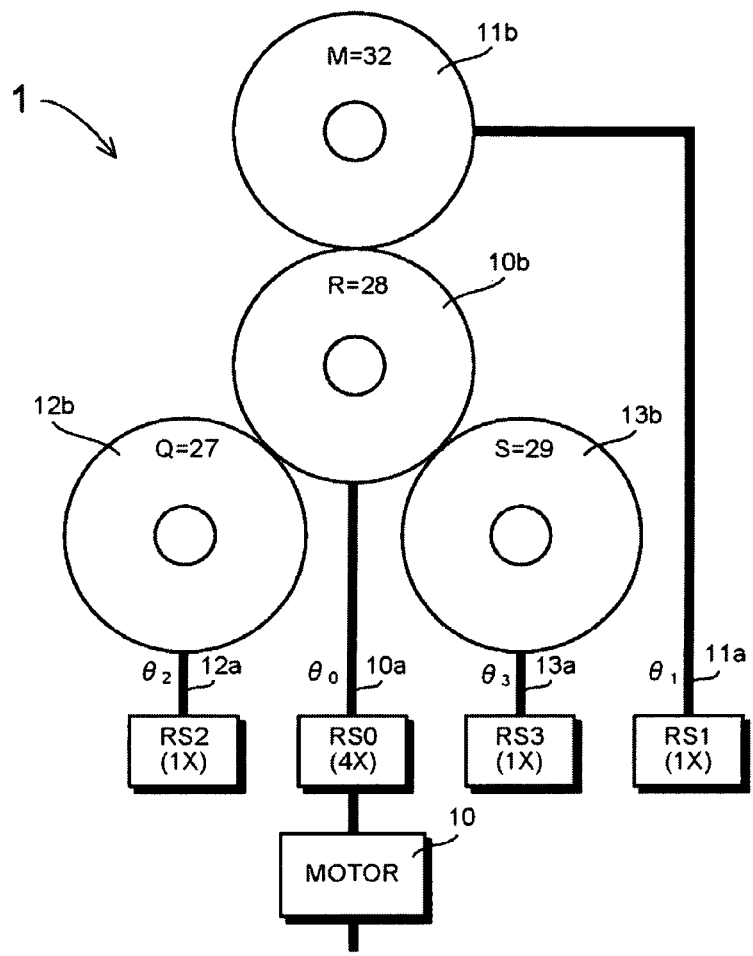
FIG. 1 is a block diagram showing a gear mechanism of a rotation angle detection apparatus adapted to detect a multi-turn absolute rotation angle, according to an embodiment.

FIG. 1 is a block diagram showing a gear mechanism 1 of a rotation angle detection apparatus adapted to detect a multi-turn absolute rotation angle, according to an embodiment. In FIG. 1, a main shaft 10a coupled to a rotating shaft of a motor 10 is coupled to a main shaft gear 10b whose number of teeth R is 28 and a resolver RS0 which is an angle detector adapted to detect a rotation angle θ0 within one rotation of the main shaft 10a is attached to the main shaft 10a. For example, the resolver RS0 outputs an angle detection signal corresponding to a rotation angle between 0 and 360 degrees. The resolver RS0 is an N-fold (NX) angle detector which outputs an N-cycle signal each time the main shaft 10a performs one rotation, and a 4-fold angle detector is used according to the present embodiment. Also, an angle detector other than a resolver may be used. Note that in the following description, a rotation angle refers to an angle within one rotation (0 to 360 degrees), but an angle over multiple rotations will be referred to as a multi-turn angle.

The main shaft gear 10b is meshed with first to third counter-shaft gears 11b, 12b, and 13b, whose rotations are transmitted to first to third counter-shafts 11a, 12a, and 13a, respectively. The numbers of teeth M, Q, and S of the first to third counter-shaft gears 11b, 12b, and 13b are 32, 27, and 29, respectively. Rotation angles $\theta_1$ to $\theta_3$ of the first to third counter-shafts 11a, 12a, and 13a are detected by resolvers RS1 to RS3 attached to the first to third counter-shafts 11a, 12a, and 13a. As with the resolver RS0, resolvers RS1 to RS3 output angle detection (value) signals corresponding to rotation angles between 0 and 360 degrees. The resolvers RS1 to RS3 are 1-fold (1X) angle detectors each of which outputs one cycle of a signal each time the respective counter-shafts performs one rotation, and an angle detector other than a resolver may be used.

If a is an integer equal to or larger than 2, the number of teeth R of the main shaft gear 10b and the numbers of teeth M, Q, and S of the first to third counter-shaft gears 11b, 12b, and 13b satisfy $$M=R\pm a, Q=R\pm 1, S=R\mp 1 \qquad \text{[Mathematical expression 1]}$$

where if k is an integer equal to or larger than 1 and N is an integer equal to or larger than 2, the number of teeth M of the first counter-shaft gear can be selected so as to satisfy M=k×a×N. In the present embodiment, R=28, Q=27, S=29, a=4, N=4, k=2, and M=32 are selected.

In the rotation angle detection apparatus 1 shown in FIG. 1, since the numbers of teeth R and M of the main shaft gear 10b and the first counter-shaft gear 11b are 28 and 32, respectively, when the main shaft 10a performs 8 rotations, first counter-shaft gear 11b performs 7 rotations, and relative gear positions of the main shaft gear 10b and first counter-shaft gear 11b return to their original state. That is, the gear positions of the main shaft gear 10b and first counter-shaft gear 11b reach their original positions when the main shaft performs a cycle of 8 rotations. Also, since the number of teeth Q of the second counter-shaft gear 12b is 27, each time the main shaft 10a performs 27 rotations, relative gear positions of the main shaft gear 10b and second counter-shaft gear 12b return to their original state. Furthermore, since the number of teeth S of the third counter-shaft gear 13b is 29, when the main shaft 10a performs 29 rotations, relative gear positions of the main shaft gear 10b and third counter-shaft gear 13b return to their original state.

Based on the above relationships, each time the main shaft 10a performs 8 rotations, one cycle of a periodic signal can be calculated from the detection signals of the resolvers RS0 and RS1 adapted to detect the respective rotation angles of the main shaft 10a and first counter-shaft 11a, each time the main shaft 10a performs 27 rotations, one cycle of a periodic signal can be calculated from the detection signal of the resolver RS0 and the detection signal of the resolver RS2 adapted to detect the rotation angle of the second counter-shaft 12a, and each time the main shaft 10a performs 29 rotations, one cycle of a periodic signal can be calculated from the detection signal of the resolver RS0 and the detection signal of the resolver RS3 adapted to detect the rotation angle of the third counter-shaft 12a. Finally, the multi-turn absolute rotation angle of the main shaft 10a can be determined from the values of the three periodic signals. A range of rotation angles in which the multi-turn absolute rotation angle can be determined is 6264 (8×27×29), which is the least common multiple of the three cycles, and consequently, the multi-turn absolute rotation angle of the main shaft 10a can be determined over the range in which the main shaft 10a performs 6264 rotations. A calculation method for determining the multi-turn absolute rotation angle θc of the main shaft 10a from the detection signal values of the resolvers RS0 to RS3 will be described below.

Figure 2:
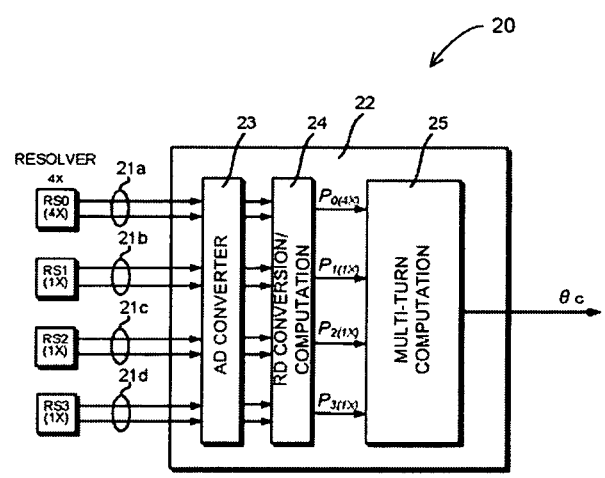
FIG. 2 is a block diagram of a rotation angle computation unit adapted to calculate a multi-turn absolute rotation angle of a main shaft.

FIG. 2 is a block diagram of a rotation angle computation unit 20 adapted to calculate the multi-turn absolute rotation angle θc of the main shaft 10a. The rotation angles of the main shaft 10a and first to third counter-shafts 11a, 12a, and 13a are detected by the respective resolvers RS0 to RS3 and are sent as two sinusoidal detection voltages (sine component and cosine component) 90° out of phase from each other to an AD converter 23 via signal lines 21a, 21b, 21c, and 21d, respectively. The two detection voltages are converted from analog values, for example, into 12-bit digital values by the AD converter 23 and sent to an RD conversion/computation circuit 24. The RD conversion/computation circuit 24 calculates angle detection values $P_{0(4X)}$, $P_{1(1X)}$, $P_{2(1X)}$, and $P_{3(1X)}$ from the two received digital values (sine component and cosine component). Note that the subscripts (4X) and (1X) attached to the symbols of the detection values indicate signal values outputted from 4-fold and 1-fold angle detectors, respectively. Also, the detection voltages of the resolvers RS0 to RS3 contain errors due to various factors including dispersion of the resolvers RS0 to RS3 themselves, magnetism, circuitry, and machine accuracy, and thus instead of converting the detection voltages directly into angles, various corrections are applied including offset correction and amplitude correction of voltage signals, error correction of the actual rotation angles, and correction to detection values of the rotating shafts.

Figure 3:
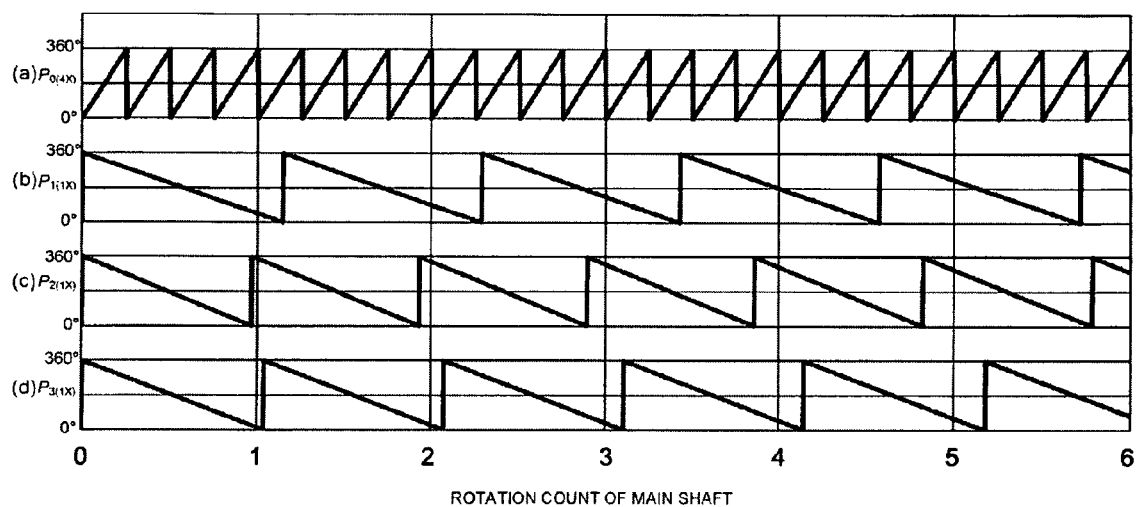
FIG. 3 is a diagram showing signal waveforms outputted from respective angle detectors for the main shaft and counter-shafts in relation to a rotation count of the main shaft, according to the embodiment of FIG. 1.

After going through the above processes, the detection values $P_{0(4X)}$, $P_{1(1X)}$, $P_{2(1X)}$, and $P_{3(1X)}$ are sent to a multi-turn computation circuit 25. FIG. 3 shows changes of the detection values $P_{0(4X)}$, $P_{1(1X)}$, $P_{2(1X)}$, and $P_{3(1X)}$ in relation to rotation count of the main shaft 10a. In FIG. 3, the abscissa represents the rotation count of the main shaft 10a and the ordinate represents an electrical angle of the shaft corresponding to a value detected as each detection value, where the values on the ordinate are expressed in degrees ranging from 0° to 360° for ease of understanding, but may be expressed in values from 0 to 1. Regarding the detection value $P_{0(4X)}$ shown in Part (a) of FIG. 3, since the angle detector RS0 is a 4-fold angle detector, four cycles of the detection value are outputted each time the main shaft 10a performs one rotation. Also, Parts (b) to (d) of FIG. 3 show changes in the rotation angles of the counter-shafts which are gear-shifted according to transmission gear ratios determined by the number of teeth of the main shaft gear and the numbers of teeth of the respective counter-shaft gears. Incidentally, the detection value $P_{0(4X)}$ is represented by a waveform increasing monotonically in a forward direction with respect to the rotation of the main shaft 10a, and the monotonous decreases of the detection values $P_{1(1X)}$, $P_{2(1X)}$, and $P_{3(1X)}$ in the backward direction mean that the rotational directions of the first to third counter-shafts 11a, 12a, and 13a are opposite the rotational direction of the main shaft 10a.

Upon receiving the detection values $P_{0(4X)}$, $P_{1(1X)}$, $P_{2(1X)}$, and $P_{3(1X)}$ shown in FIG. 3, the multi-turn computation unit 25 of FIG. 2, performs calculations described below and eventually calculates the multi-turn absolute rotation angle $\theta_c$ of the main shaft 10a from these detection values. First, since the angle detector RS0 generates an N-fold angle output, the detection value $P_{0(NX)}$ of the main shaft, which is the remainder obtained by multiplying the multi-turn angle $\theta_0$ of the main shaft 10a by N and then dividing the product by a basic unit quantity u per rotation, is given by Eq. (1) below.

[Mathematical expression 2]

$$P_{0(NX)} = \mod(N \times \theta_0, u) \tag{1}$$

In the following calculation formulae, mod (x, a) represents a remainder computation for finding the remainder by dividing x by a, the numerical value N represents the value of an angle multiplication factor (4 according to the present embodiment) of the angle detector RS0, and u represents the basic unit quantity per rotation of (360° according to the present embodiment) the rotating shaft.

Next, since the first to third counter-shafts 11a, 12a, and 13a are meshed with the main shaft gear 10b, the multi-turn angles $\theta_1$, $\theta_2$, and $\theta_3$ of the first to third counter-shafts 11a, 12a, and 13a are given by Eqs. (2) to (4) below. Note that the minus sign attached to the head of each equation indicates that the given counter-shaft rotates in a direction opposite the main shaft.

[Mathematical expression 3]

$$\theta_1 = -\frac{M \mp a}{M} \times \theta_0 \tag{2}$$

[Mathematical expression 4]

$$\theta_2 = -\frac{Q+1}{Q} \times \theta_0 \tag{3}$$

[Mathematical expression 5]

$$\theta_3 = -\frac{S-1}{S} \times \theta_0 \tag{4}$$

Since the multi-turn angles $\theta_1$, $\theta_2$, and $\theta_3$ of the first to third counter-shafts 11a, 12a, and 13a are given by Eqs. (2) to (4), the detection values $P_{1(1X)}$, $P_{2(1X)}$, and $P_{3(1X)}$ of the rotation angles of the first to third counter-shafts, which are detected by 1-fold angle detectors and which are equal to the remainders obtained by dividing the multi-turn angles of the respective counter-shafts by the basic unit quantity u, are given by Eqs. (5) to (7) below.

[Mathematical expression 6]

$$P_{1(1X)} = \mod(\theta_1, u) = \mod\left(-\frac{M \mp a}{M} \times \theta_0, u\right) \tag{5}$$

[Mathematical expression 7]

$$P_{2(1X)} = \mod(\theta_2, u) = \mod\left(-\frac{Q-1}{Q} \times \theta_0, u\right) \tag{6}$$

[Mathematical expression 8]

$$P_{3(1X)} = \mod(\theta_3, u) = \mod\left(-\frac{S-1}{S} \times \theta_0, u\right) \tag{7}$$

Note that as described above, the numbers of teeth of the first to third counter-shafts 11*a*, 12*a*, and 13*a* are M=32, Q=27, and S=29, respectively, according to the present embodiment.

Since the angle detector RS0 attached to the main shaft is an N-fold angle detector which outputs an N-cycle signal each time the main shaft 10*a* performs one rotation, as shown by the 4-fold angle waveform in Part (a) of FIG. 3, the detection value outputted from the angle detector, i.e., the output value of the angle detector, does not uniquely indicate the rotation angle of the main shaft. Therefore, with the N-fold angle detector, to determine the rotation angle of the main shaft, it is necessary to discriminate to which discrimination region of the main shaft the outputted detection value belongs, in other words, to which sawtooth pulse the detection value belongs.

A discrimination value is generated as follows using a difference in the amount of rotation between the main shaft and first counter-shaft. Since the detection value of the main shaft is an N-fold angle and the detection value of the first counter-shaft is a 1-fold angle, the detection value of the difference in the amount of rotation cannot be calculated as it is. Thus, first, an N-fold angle detection value $P_{1(NX)}$ is generated from the detection value of the 1-fold angle detector by finding a remainder obtained by multiplying the detection value $P_{1(1X)}$ of the first counter-shaft by N and dividing the product by the basic unit quantity u, as shown in Eq. (8) below.

[Mathematical expression 9]

$$P_{1(NX)} = \mathrm{mod}(P_{1(1X)} \times N, u) \quad (8)$$
$$= \mathrm{mod}\left(-\frac{M \mp a}{M} \times N \times \theta_0, u\right)$$
$$= \mathrm{mod}\left(\left(-N \pm \frac{aN}{M}\right) \times \theta_0, u\right)$$

Figure 4:
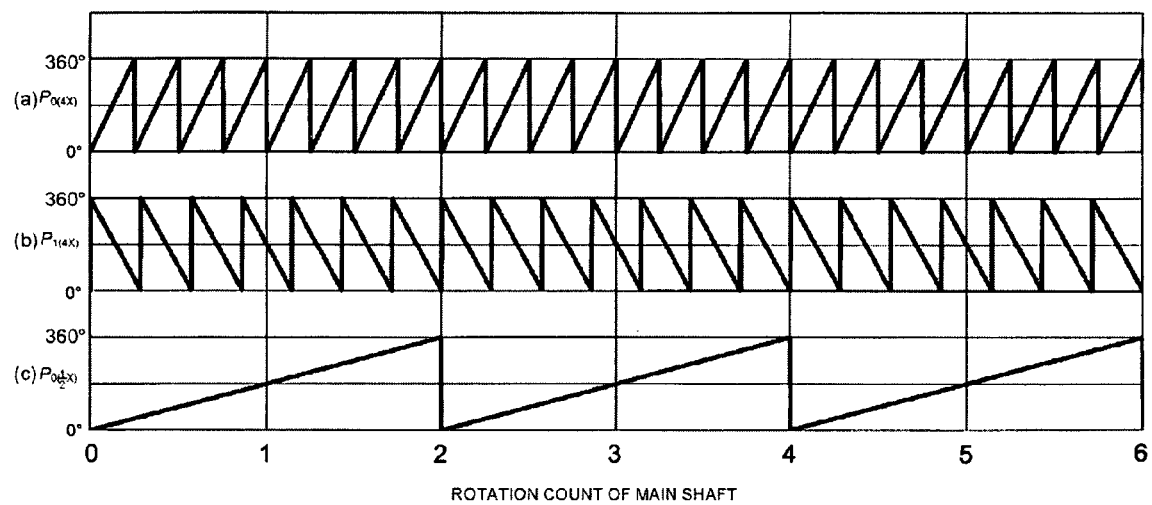
FIG. 4 shows signal waveforms used to discriminate a discrimination region of the main shaft, according to the embodiment of FIG. 1.

In relation to the rotation count of the main shaft, a 4-fold angle detection value $P_{1(4X)}$ of the first counter-shaft has a waveform shown in Part (b) of FIG. 4. Incidentally, Part (a) of FIG. 4 shows a 4-fold angle detection value $P_{0(4X)}$ of the main shaft 11*a*.

Next, a difference between the detection values of the main shaft and first counter-shaft is determined. According to the present embodiment, since the rotation of the counter-shafts is treated as negative when the rotation of the main shaft is taken as positive, the difference can be found by addition. Since mod (a, c)+mod (b, c)=mod (a+b, c) holds in remainder calculation, when the N-fold angle detection value $P_{1(NX)}$ of the first counter-shaft is determined, a periodic signal of M/aN rotations is obtained by adding the detection value $P_{0(NX)}$ of the main shaft to the detection value $P_{1(NX)}$ as shown in Eq. (9) below. Thus, from the sum of the N-fold angle detection values of the main shaft and first counter-shaft, one cycle of a periodic signal $P_{0((aN/M) \times X)}$ is obtained each time the main shaft performs M/aN rotations.

[Mathematical expression 10]

$$P_{0\left(\frac{aN}{M}X\right)} = (P_{0(NX)} + P_{1(NX)}) \quad (9)$$
$$= \mathrm{mod}(N \times \theta_0, u) + \mathrm{mod}\left(\left(-N \pm \frac{aN}{M}\right) \times \theta_0, u\right)$$
$$= \mathrm{mod}\left(\pm \frac{aN}{M} \times \theta_0, u\right)$$

A waveform of the periodic signal of Eq. (9) is shown in Part (c) of FIG. 4. When the numerical values a=4, N=4, M=32, u=360 selected in the present embodiment are substituted into Eq. (9), a signal of two (=M/aN) rotation cycles is obtained.

The periodic signal shown in Part (c) of FIG. 4 has a sawtooth-shaped waveform which monotonically increases each time the main shaft performs two rotations. The signal waveform of the detection value $P_{0(4X)}$ of the main shaft 11*a* shown in Part (a) of FIG. 4 also has a sawtooth-shaped waveform, but repeats eight cycles of sawtooth pulses during one cycle of the periodic signal shown in Part (c) of FIG. 4. Therefore, the value calculated by Eq. (9) can be used as a discrimination value for discriminating which of the four sawtooth pulses in one rotation of the main shaft the angle detection value $P_{0(4X)}$ of the main shaft detected by the angle detector RS0 of the main shaft is positioned at. Generally, the sawtooth pulses of the angle detection value $P_{0(NX)}$ of the main shaft are repeated for M/a cycles during one cycle of the periodic signal shown in Part (c) of FIG. 4, and by dividing the value of the periodic signal shown in Part (c) of FIG. 4 into M/a regions, it is possible to discriminate in which discrimination region within one rotation of the main shaft the angle detection value $P_{0(NX)}$ is positioned.

Furthermore, as described below, a signal of a stepped waveform may be generated from the periodic signals in Parts (a) and (c) of FIG. 4 and used for region discrimination of the detection value $P_{0(NX)}$. That is, using the calculation of Eq. (10) below, a stepped waveform $R_0$ shown in Part (a) of FIG. 5 can be generated from the periodic signal shown in Part (c) of FIG. 4.

[Mathematical expression 11]

$$R_0 = \left(P_{0\left(\frac{aN}{M}\right)} \times \frac{M}{a} - P_{0(NX)}\right) \times \frac{1}{u} \quad (10)$$

When the numerical values a=4, N=4, M=32, u=360 selected in the present embodiment are substituted into Eq. (10), Eq. (10) presents a stepped waveform $R_{(0-7)}$ with (M/a−1) steps (seven steps according to the present embodiment) as shown in Part (a) of FIG. 5.

A stepped waveform $R_0'$ with (N−1) steps can be generated by performing the process of Eq. (11) below for finding a remainder by dividing the stepped waveform $R_0$ by N, the stepped waveform $R_0$ being determined using Eq. (10).

[Mathematical expression 12]

$$R_0' = \mathrm{mod}(R_0, N) \quad (11)$$

When N=4 is substituted into Eq. (11), Eq. (11) presents a stepped waveform $R_{(0-3)}'$ with three steps (N−1 steps) as shown in Part (b) of FIG. 5. A stepped waveform corresponding to cycles per rotation of the main shaft is generated in this way, and can be used as a region discrimination value of the detection signal obtained by the 4-fold angle detector RS0 of the main shaft.

Figure 6:
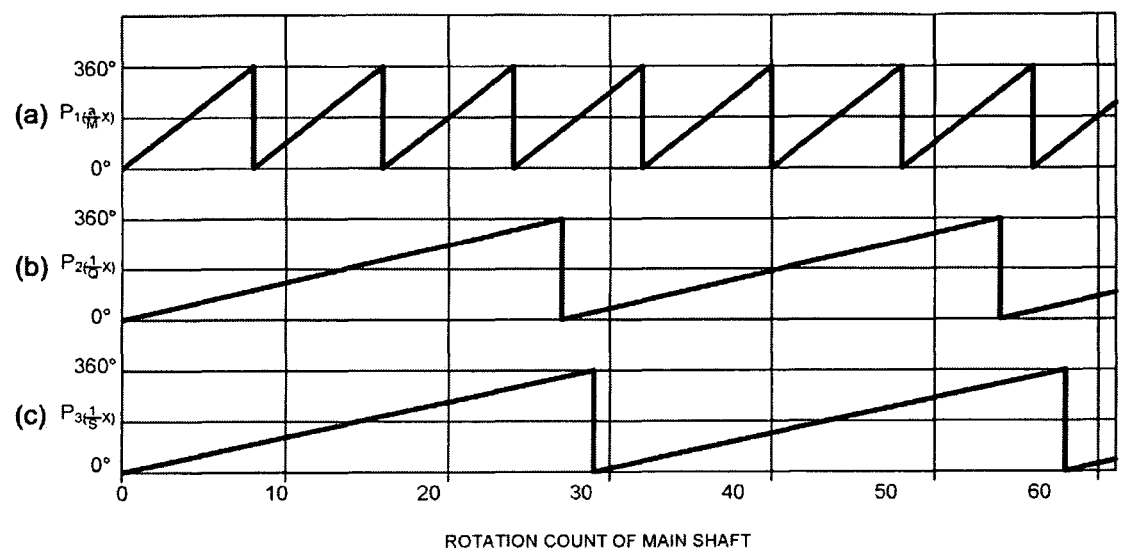
FIG. 6 shows waveforms of periodic signals outputted from respective rotation angle detectors of counter-shafts in relation to the rotation count of the main shaft, according to the embodiment of FIG. 1.

Next, generation of a periodic signal for each counter-shaft in relation to the main shaft will be described. The periodic signal represents a difference in the rotation angle between the main shaft and counter-shaft. In other words, the main shaft gear and counter-shaft gear mesh with each other at the same position every cycle of the periodic signal. By taking the gear position of the main shaft and the counter-shaft at a certain time point as an initial position (position where the rotation count of the main shaft is indicated as 0), FIG. 6 shows how much the gear position of the counter-shaft is shifted in degrees from the gear position of the main shaft as the main shaft rotates. Part (a) of FIG. 6 shows a periodic signal of the first counter-shaft, representing changes in a shift angle of the gear position of the first counter-shaft with respect to the gear position of the main shaft, Part (b) of FIG. 6 shows a periodic signal of the second counter-shaft, representing changes in a shift angle of the gear position of the second counter-shaft with respect to the gear position of the main shaft, and Part (c) of FIG. 6 shows a periodic signal of the third counter-shaft, representing changes in a shift angle of the gear position of the third counter-shaft with respect to the gear position of the main shaft. In FIG. 6, all combinations of the values of the periodic signals differ from one another during the interval from when the main shaft is at the initial position where the values of all the periodic signals are a combination of 0s to when the main shaft returns to the initial position again after a rotation. That is, there is only one combination of certain values of the periodic signals during a period from an initial position to a next initial position. Thus, if a combination of values of the periodic signals is determined, the rotation count of the main shaft from the initial position can be determined. In other words, if the rotation count of the main shaft starting from the rotation count of the main shaft corresponding to a value 0 of the periodic signal is defined as the relative rotation count of each counter-shaft during one cycle of the periodic signal (at the initial position, the relative rotation counts of the counter-shafts are all 0), the rotation count of the main shaft starting from the initial position can be found from a combination of the relative rotation counts. The cycles required until all the periodic signals return to their initial positions are determined from the least common multiple of the cycles of the periodic signals. According to the present embodiment, since the cycles of the first to third counter-shafts correspond to 8, 27, and 29 rotations, respectively, and thus the least common multiple thereof is 6264 (=8×27×29) rotations. Therefore, by determining the relative rotation counts of the counter-shafts from the periodic signals of the counter-shafts, it is possible to determine a multi-turn absolute rotation angle (total rotation angle of 6264 rotations according to the present embodiment) of the main shaft as described below.

First, to obtain a periodic signal, it is necessary to use detection values outputted from angle detectors of the same multiplication factor. According to the present embodiment, since the angle detectors of the counter-shafts are 1-fold angle detectors, the detection value obtained from the angle detector of the main shaft needs to be converted into a 1-fold angle detection value. Thus, the 1-fold angle detection value $P_{0(1X)}$ of the main shaft is synthesized by Eq. (12) below using the N-fold angle detection value $P_{0(NX)}$ of the main shaft and Eq. (11) above.

[Mathematical expression 13]

$$P_{0(1X)} = \frac{R'_0 \times u + P_{0(NX)}}{N} \quad (12)$$

When the numerical values a=4, N=4, M=32, u=360 selected in the present embodiment are substituted into the 1-fold angle detection value $P_{0(1X)}$ of the main shaft synthesized using Eq. (12), a sawtooth-shaped waveform is obtained, where the waveform performs one cycle, increasing monotonically each time the main shaft performs a rotation as shown in Part (c) of FIG. 5.

Once the 1-fold angle detection value $P_{0(1X)}$ of the main shaft is synthesized, the 1-fold angle detection value $P_{0(1X)}$ of the main shaft and the detection value $P_{1(1X)}$ of the first counter-shaft are added together as shown in Eq. (13) below to obtain one cycle of the periodic signal of the first counter-shaft each time the main shaft performs M/a rotations.

[Mathematical expression 14]

$$P_{1(\frac{a}{M}X)} = P_{0(1X)} + P_{1(1X)} \quad (13)$$

$$= \mathrm{mod}(\theta_0, u) + \mathrm{mod}\left(\left(-1 \pm \frac{a}{M}\right) \times \theta_0, u\right)$$

$$= \mathrm{mod}\left(\pm \frac{a}{M} \times \theta_0, u\right)$$

Note that mod (a, c)+mod (b, c)=mod (a+b, c) holds in remainder calculation. When the numerical values a=4, M=32, u=360 according to the present embodiment are substituted into Eq. (13), one cycle of the periodic signal is obtained each time the main shaft performs eight rotations as shown in Part (a) of FIG. 6.

Also, when the detection value $P_{2(1X)}$ of the second counter-shaft is added to the 1-fold angle detection value $P_{0(1X)}$ of the main shaft, one cycle of the periodic signal of the second counter-shaft is obtained each time the main shaft performs Q rotations as shown in Eq. (14) below. According to the present embodiment, one cycle of the periodic signal of the second counter-shaft is obtained each time the main shaft performs 27 rotations as shown in Part (b) of FIG. 6. Furthermore, when the detection value $P_{3(1X)}$ of the third counter-shaft is added to the 1-fold angle detection value $P_{0(1X)}$ of the main shaft, one cycle of the periodic signal of the third counter-shaft is obtained each time the main shaft performs S rotations as shown in Eq. (15) below. According to the present embodiment, one cycle of the periodic signal of the third counter-shaft is obtained each time the main shaft performs 29 rotations as shown in Part (c) of FIG. 6.

[Mathematical expression 15]

$$P_{2(\frac{1}{Q}X)} = P_{0(1X)} + P_{2(1X)} \quad (14)$$

$$= \mathrm{mod}(\theta_0, u) + \mathrm{mod}\left(\left(-1 \pm \frac{1}{Q}\right) \times \theta_0, u\right)$$

$$= \mathrm{mod}\left(\pm \frac{1}{Q} \times \theta_0, u\right)$$

[Mathematical expression 16]

$$P_{3(\frac{1}{S}X)} = P_{0(1X)} + P_{3(1X)} \quad (15)$$

$$= \mathrm{mod}(\theta_0, u) + \mathrm{mod}\left(\left(-1 \pm \frac{1}{S}\right) \times \theta_0, u\right)$$

$$= \mathrm{mod}\left(\pm \frac{1}{S} \times \theta_0, u\right)$$

Once the periodic signals of all the counter-shafts are obtained, the relative rotation counts of the counter-shaft gears are calculated next. Since the number of rotations per cycle of the periodic signal of each counter-shaft is known, the relative rotation count is obtained by multiplying the ratio of the periodic signal value to the basic unit quantity u by the number of rotations per cycle. Eqs. (16), (17), and

(18) below are used to calculate the relative rotation counts m1 to m3 of the first to third counter-shaft gears.

[Mathematical expression 17]

$$m1 = P_{1(\frac{a}{M}X)} \Big/ u \times \frac{M}{a} \qquad (16)$$

[Mathematical expression 18]

$$m2 = P_{2(\frac{1}{Q}X)} \Big/ u \times Q \qquad (17)$$

[Mathematical expression 19]

$$m3 = P_{3(\frac{1}{S}X)} \Big/ u \times S \qquad (18)$$

If relationships between a multi-turn rotation count n of the main shaft and the relative rotation counts m1 to m3 of the counter-shafts are calculated beforehand and stored as a lookup table in a storage device (such as a ROM) as shown in FIG. 7, a multi-turn rotation count of the main shaft which matches a combination of the relative rotation counts can be found by searching the lookup table. For example, if the relative rotation counts of the first to third counter-shaft gears are 4, 18, and 22, the rotation count of the main shaft is 6228 from the lookup table of FIG. 7. As another embodiment, even when there are two counter-shafts, the multi-turn rotation count of the main shaft can be determined (if there are as many gears as the present embodiment, the number of rotations up to 216 can be detected). For example, if the relative rotation counts of the first and second counter-shaft gears are 5 and 24, the rotation count of the main shaft is 213 from the lookup table of FIG. 7.

The multi-turn absolute rotation angle of the main shaft can be found by adding together the multi-turn rotation count of the main shaft and rotation angle within one rotation of the main shaft. The rotation angle within one rotation of the main shaft can be found by applying region discrimination to an output signal $P_{0(4X)}$ from the 4-fold angle detector RS0 of the main shaft. Alternatively, the rotation angle may be found from the detection value $P_{0(1X)}$ of the main shaft synthesized into a 1-fold angle detection value shown in Part (c) of FIG. 5.

Figure 8:
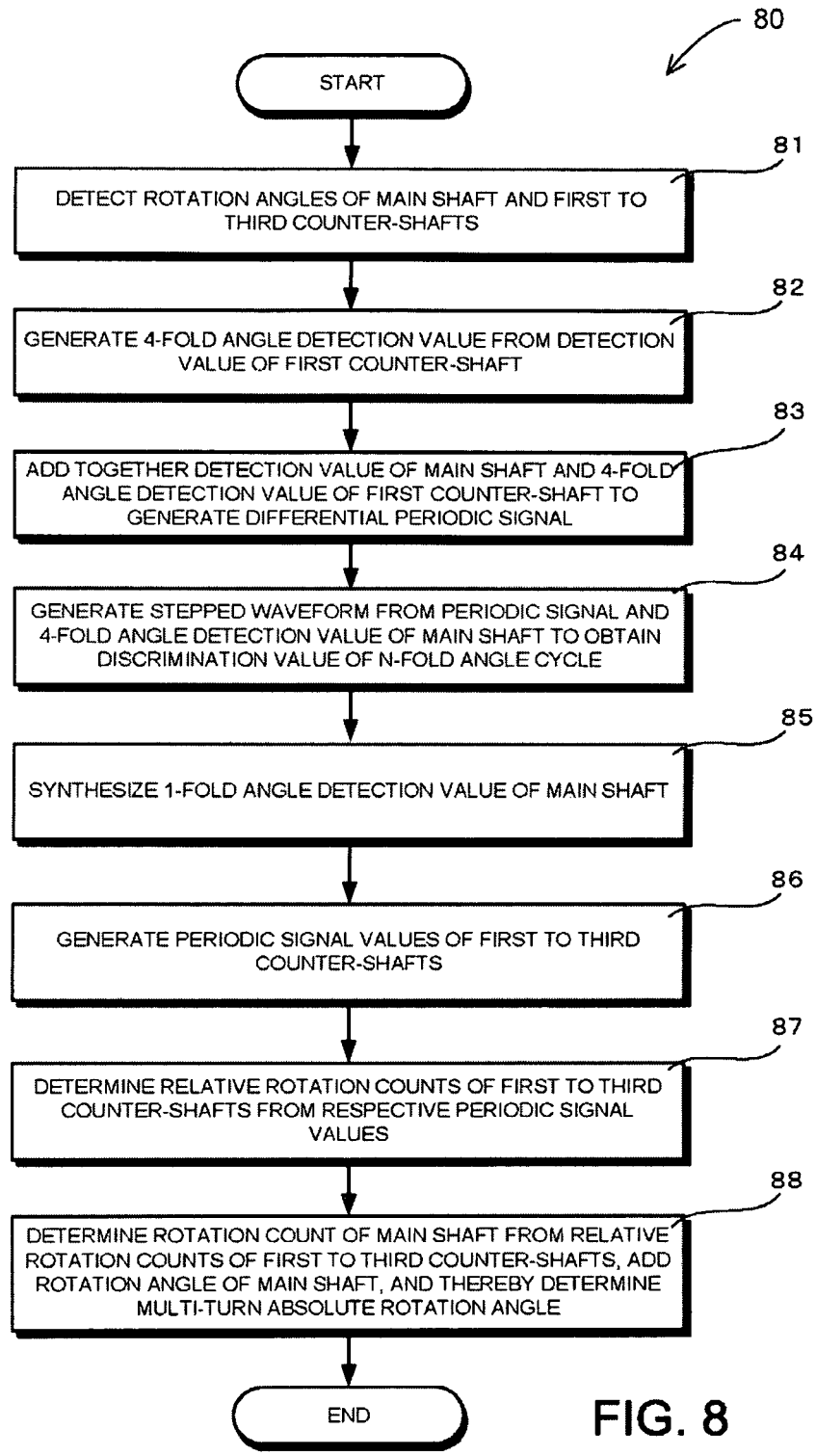
FIG. 8 is a flowchart illustrating procedures for determining the multi-turn absolute rotation angle of the main shaft from rotation angles of the main shaft and counter-shafts.

Next, with reference to a flowchart shown in FIG. 8, description will be given of procedures for determining the multi-turn absolute rotation angle of the main shaft from rotation angles of the main shaft and counter-shafts. First, in step 81, the angle detector RS0 attached to the main shaft 10a shown in FIG. 1 detects the 4-fold angle detection value $P_{0(4X)}$ while the angle detectors RS1 to RS3 attached to the first to third counter-shafts 11a, 12a, and 13a detect 1-fold angle detection values $P_{1(1X)}$ to $P_{3(1X)}$, respectively. These detection values present the waveforms shown in FIG. 3 in relation to the rotation count of the main shaft.

Once the detection values of the main shaft and counter-shafts are detected, the flow goes to step 82, where the 1-fold angle detection value $P_{1(1X)}$ of the first counter-shaft is converted into a 4-fold angle detection value $P_{1(4X)}$ according to Eq. (8) to discriminate to which discrimination region within one rotation of the main shaft the angle detection value $P_{0(NX)}$ of the main shaft belongs. Next, in step 83, the 4-fold angle detection value $P_{0(4X)}$ of the main shaft is added to the 4-fold angle detection value $P_{1(4X)}$ to generate a discrimination value for use to discriminate the discrimination region. The discrimination value presents the discrimination waveform shown in Part (c) of FIG. 4 in relation to the rotation count of the main shaft. Therefore, based on the discrimination value, it is determined to which sawtooth pulse of the sawtooth waveform shown in Part (a) of FIG. 4 the detection value detected by the angle detector RS0 of the main shaft belongs. As a result of the discrimination, the rotation angle of the main shaft is derived from the detection value. The discrimination described above identifies the discrimination region to which the detection value belongs, based on the discrimination value. However, as described below, the rotation angle of the main shaft may be determined by further processing the discrimination value and synthesizing a 1-fold angle detection value of the main shaft.

In step 84, a stepped waveform value shown in Part (a) of FIG. 5 is generated by applying the process shown in Eq. (10) to the discrimination value determined in step 83. Furthermore, by substituting the stepped waveform value into Eq. (11), a stepped waveform value which cycles every rotation of the main shaft as shown in Part (b) of FIG. 5 is generated. The flow goes to step 85 to synthesize a 1-fold angle detection value of the main shaft by substituting the stepped waveform value into Eq. (12). The 1-fold angle detection value of the main shaft represents the rotation angle of the main shaft as shown in Part (c) of FIG. 5.

Once the 1-fold angle detection value of the main shaft shown in Part (c) of FIG. 5 is obtained, the periodic signal values of the first to third counter-shafts are generated according to Eqs. (13) to (15) in step 86. These known signal values in relation to the rotation count of the main shaft are shown in Parts (a) to (c) of FIG. 6. Once the periodic signal values of the first to third counter-shafts are generated, the relative rotation counts of the first to third counter-shaft gears in relation to the main shaft are determined according to Eqs. (16) to (18) in step 87. A combination which matches the relative rotation counts m1 to m3 of the first to third counter-shaft gears is searched in the lookup table of FIG. 7 and the rotation count n of the main shaft corresponding to the matched combination is outputted. Once the rotation count n of the main shaft is determined, the flow goes to step 88, where the rotation angle of the main shaft is added to the rotation count n of the main shaft to eventually obtain the multi-turn absolute rotation angle.

Finally, to properly perform the region discrimination described above in the gear mechanism used in some embodiments, the accuracy required of the angle detector of the first counter-shaft will be discussed. First, let $e_1$ and $e_2$ denote the absolute values of errors in the detection values of the main shaft and first counter-shaft per rotation. When discrimination of M rotation cycles is performed between the main shaft and first counter-shaft using a 1-fold angle detector for the main shaft, generally $e_1 + e_2$ needs to satisfy the following equation.

[Mathematical expression 20]

$$e_1 + e_2 < \frac{1}{2M}$$

Now, if it is assumed that $e_1 \approx 0$, the error allowed for the angle detector of the first counter-shaft needs to satisfy Eq. (19) below.

[Mathematical expression 21]

$$e_2 < \frac{1}{2M} \qquad (19)$$

Next, when an N-fold angle detector is used for the main shaft as in some embodiments, since the first counter-shaft is multiplied by N, the following equation needs to be satisfied.

$$e_1 + N \times e_2 < \frac{a}{2M} \quad \text{[Mathematical expression 22]}$$

Now, if it is assumed that $e_1 \approx 0$, the following equation holds.

$$e_2 < \frac{a}{2NM} \quad \text{[Mathematical expression 23]}$$

If it is assumed that a=N, the following equation holds.

[Mathematical expression 24]

$$e_2 < \frac{1}{2M} \quad (20)$$

After all, since Eq. (20) is equal to Eq. (19), the accuracy required of the angle detector of the first counter-shaft according to some embodiments may be equal to the accuracy of the 1-fold angle detector attached to the main shaft.

In contrast, when the process shown in Patent Literature 1 is performed using an N-fold angle detector for the main shaft with the gear configuration disclosed in the literature, the accuracy required of a first driven gear needs to satisfy the following equation.

$$\frac{e_1}{N} + e_2 < \frac{1}{2NM} \quad \text{[Mathematical expression 25]}$$

Now, if it is assumed that $e_1 \approx 0$, the following equation holds.

$$e_2 < \frac{1}{2NM} \quad \text{[Mathematical expression 26]}$$

Thus, it can be seen that N times the accuracy available with the use of a 1-fold angle detector is required.

EXPLANATIONS OF REFERENCE NUMERALS

1 Gear mechanism
10 Motor
11a, 12a, 13a First to third counter-shafts
11b, 12b, 13b First to third counter-shaft gears
20 Rotation angle computation unit
21a, 21b, 21c, 21d Signal line
23 AD converter
24 RD conversion/computation circuit
25 Multi-turn computation circuit
RS0-RS3 Resolver
$\theta_0$ Rotation angle of main shaft
$\theta_0$ to $\theta_3$ Rotation angles of first to third counter-shafts

The invention claimed is:

1. A multi-turn rotation angle detection apparatus comprising:
a main shaft gear mounted on a main shaft;
a first counter-shaft gear and a second counter-shaft gear adapted to mesh with the main shaft gear;
a first counter-shaft and a second counter-shaft adapted to transmit rotations of the first counter-shaft gear and the second counter-shaft gear, respectively;
a set of angle detectors including (i) a main shaft angle detector adapted to detect a rotation angle of the main shaft, (ii) a first counter-shaft angle detector adapted to detect a rotation angle of the first counter-shaft, and (iii) a second counter-shaft angle detector adapted to detect a rotation angle of the second counter-shaft, where the main shaft angle detector is adapted to output N cycles of an N-fold angle detection value $P_{0(NX)}$ per rotation of the main shaft, the first counter-shaft angle detector is adapted to output one cycle of a 1-fold angle detection value $P_{1(1X)}$ per rotation of the first counter-shaft, and the second-counter shaft angle detector is adapted to output one cycle of a 1-fold angle detection value $P_{2(1X)}$ per rotation of the second counter-shaft ; and
a gear mechanism having a teeth number difference of a two or larger integer A between the first counter-shaft gear and the main shaft gear, and a teeth number difference of 1 between the main shaft gear and the second counter-shaft gear, a number of teeth of the first counter-shaft gear being an integer multiple of a product of the teeth number difference of the two or larger integer A and a shaft angle multiplier N of the main shaft angle detector;
wherein:
a multi-turn absolute rotation angle of the main shaft is determined from rotation angle detection values of the main shaft, the first counter-shaft, and the second counter-shaft;
and
the multi-turn rotation angle detection apparatus further comprises:
a main shaft rotation angle detection means adapted to (i) determine a signal $P_{0(((AN)/M)xX)}$ one cycle of which corresponds to M/(AN) rotations of the main shaft from the N-fold angle detection value $P_{0(NX)}$ detected by the main shaft angle detector and the 1-fold angle detection value $P_{1(1X)}$ of the first counter-shaft detected by the first counter-shaft angle detector, M being the number of teeth of the first counter-shaft gear, (ii) obtain a discrimination value, which indicates to which cycle of the N cycles the N-fold angle detection value $P_{0(NX)}$ detected by the main shaft angle detector belongs, from the signal $P_{0(((AN)/M)xX)}$, and (iii) synthesize one cycle of a 1-fold angle detection value $P_{0(1X)}$ of the main shaft per rotation of the main shaft from the discrimination value and the N-fold angle detection value $P_{0(NX)}$; and
a main shaft rotation count detection means adapted to (i) generate a first counter-shaft periodic signal, which represents a difference in a rotation count of the main shaft and a rotation count of the first counter-shaft, from the 1-fold angle detection value $P_{0(1X)}$ of the main shaft and the 1-fold angle detection value $P_{1(1X)}$ of the first counter-shaft, (ii) generate a second counter-shaft periodic signal, which represents a difference in the rotation count of the main shaft and a rotation count of the second counter-shaft, from the 1-fold angle detection value $P_{0(1X)}$ of the main shaft and the 1-fold angle detection value $P_{2(1X)}$ of the second counter-shaft detected by the second counter-shaft angle detector, and (iii) determine the rotation count of the main shaft from the first counter-shaft periodic signal and the second counter-shaft periodic signal.

2. The multi-turn rotation angle detection apparatus according to claim 1, wherein:
the gear mechanism further includes a third counter-shaft gear adapted to mesh with the main shaft gear and a third counter-shaft adapted to transmit rotation of the third counter-shaft gear;
the set of angle detectors further includes a third counter-shaft angle detector adapted to detect a rotation angle of the third counter-shaft;
the third counter-shaft angle detector is adapted to output one cycle of a 1-fold angle detection value $P_{3(1X)}$ of the third counter-shaft per rotation of the third counter-shaft; and
the main shaft rotation count detection means is further adapted to (i) generate a third counter-shaft periodic signal, which represents a difference in a rotation count of the main shaft and a rotation count of the third counter-shaft, from the 1-fold angle detection value $P_{0(1X)}$ of the main shaft and the 1-fold angle detection value $P_{3(1X)}$ of the third counter-shaft, and (ii) determine the rotation count of the main shaft from the first counter-shaft periodic signal, the second counter-shaft periodic signal, and the third counter-shaft periodic signal.

3. The multi-turn rotation angle detection apparatus according to claim 2, wherein:
S denotes a number of teeth of the third counter-shaft gear;
when a number of teeth of the second counter-shaft gear is Q=R−1, then S=R+1; and
when the number of teeth of the second counter-shaft gear is Q=R+1, then S=R−1.

4. The multi-turn rotation angle detection apparatus according to claim 1, further comprising:
a third counter-shaft gear; and
a third counter-shaft adapated to transmit rotation of the third counter-shaft gear;
wherein:
the set of angle detectors further includes a third counter-shaft angle detector adapted to detect a rotation angle of the third count-shaft;
there is a teeth number difference of 1 between the main shaft gear and the third counter-shaft gear;
the main shaft rotation count detection means is further adapted to generate a third counter-shaft periodic signal, which represents a difference in a rotation count of the main shaft and a difference in a rotation count of the third counter-shaft, from the 1-fold angle detection value $P_{0(1X)}$ of the main shaft and a 1-fold angle detection value $P_{3(1X)}$ of the third counter-shaft detected by the third counter-shaft angle detector; and
the main shaft rotation count detection means is further adapted to determine the rotation count of the main shaft from the first counter-shaft periodic signal, the second counter-shaft periodic signal, and the third counter-shaft periodic signal.

5. The multi-turn rotation angle detection apparatus according to claim 1, wherein the discrimination value obtained from the signal $P_{0(((AN)/M)xX)}$ is a remainder obtained by dividing a sum or a difference between the N-fold angle detection value $P_{0(NX)}$ and an N-fold angle detection value $P_{1(NX)}$ of the first counter-shaft by a basic unit quantity u per cycle, where the N-fold angle detection value $P_{1(NX)}$ is calculated as a remainder obtained by dividing a product of the 1-fold angle detection value $P_{1(1X)}$ of the first counter-shaft and N by the basic unit u, the 1-fold angle detection value $P_{1(1X)}$ being detected by the first counter-shaft angle detector.

6. A multi-turn rotation angle detection method for a multi-turn rotation angle detection apparatus, the multi-turn rotation angle detection apparatus comprising:
a main shaft gear mounted on a main shaft which transmits rotation of a rotational drive source;
a first counter-shaft gear and second counter-shaft gear adapted to mesh with the main shaft gear;
a first counter-shaft and second counter-shaft adapted to transmit rotations of the first counter-shaft gear and the second counter-shaft gear, respectively;
a set of angle detectors including (i) a main shaft angle detector adapted to detect a rotation angle of the main shaft, (ii) a first counter-shaft angle detector adapted to detect a rotation angle of the first counter-shaft, and (iii) a second counter-shaft angle detector adapted to detect a rotation of the second counter-shaft, where the main shaft angle detector is adapted to output N cycles of an N-fold angle detection value $P_{0(NX)}$ per rotation of the main shaft, the first counter-shaft angle detector is adapted to output one cycle of a 1-fold angle detection value $P_{1(1X)}$ per rotation of the first counter-shaft, and the second counter shaft angle detector is adapted to output one cycle of a 1-fold angle detection value $P_{2(1X)}$ per rotation of the second counter-shaft; and
a gear mechanism having a teeth number difference of a two or a larger integer A between the first counter-shaft gear and the main shaft gear, and a teeth number difference of 1 between the main shaft gear and the second counter-shaft gear, a number of teeth of the first counter-shaft gear being an integer multiple of a product of the teeth number difference of the two or larger integer A and a shaft angle multiplier N of the main shaft angle detector;
wherein:
a multi-turn absolute rotation angle of the main shaft is determined from rotation angle detection values of the main shaft, the first counter-shaft, and the second counter-shaft;
and
the multi-turn rotation angle detection method comprising:
detecting with the main shaft angle detector the N cycles of the N-fold angle detection value $P_{0(NX)}$ per rotation of the main shaft, which is the rotation angle of the main shaft;
detecting with the first counter-shaft angle detector one cycle of a 1-fold angle detection value $P_{1(1X)}$ of the first counter-shaft per rotation of the first counter-shaft, which is the rotation angle of the first counter-shaft;
detecting with the second counter-shaft angle detector one cycle of a 1-fold angle detection value $P_{2(1X)}$ of the second counter-shaft per rotation of the second counter-shaft, which is the rotation angle of the second counter-shaft;
determining a signal $P_{0((AN/M)xX)}$ one cycle of which corresponds to M/(AN) rotations of the main shaft from the N-fold angle detection value $P_{0(NX)}$ and the 1-fold angle detection value $P_{1(1X)}$ of the first counter-shaft, where M is the number of teeth of the first counter-shaft gear;

obtaining from the signal $P_{0((AN/M)xX)}$ a discrimination value, which indicates to which cycle of the N cycles the N-fold angle detection value $P_{0(NX)}$ belongs, and thereby determining a rotation angle within one rotation of the main shaft;

synthesizing one cycle of a 1-fold angle detection value $P_{0(1X)}$ of the main shaft per rotation of the main shaft from the discrimination value and the N-fold angle detection value $P_{0(NX)}$;

generating a first counter-shaft periodic signal, which represents a difference in a rotation count of the main shaft and a rotation count of the first counter-shaft, from the 1-fold angle detection value $P_{0(1X)}$ of the main shaft and the 1-fold angle detection value $P_{1(1X)}$ of the first counter-shaft;

generating a second counter-shaft periodic signal which represents a difference in a rotation count of the main shaft and a rotation count of the second counter-shaft, from the 1-fold angle detection value $P_{0(1X)}$ of the main shaft and the 1-fold angle detection value $P_{2(1X)}$ of the second counter-shaft; and determining the rotation count of the main shaft from the first counter-shaft periodic signal and the second counter-shaft periodic signal.

7. The multi-turn rotation angle detection method according to claim 6, wherein:

the gear mechanism further includes a third counter-shaft gear adapted to mesh with the main shaft gear and a third counter-shaft adapted to transmit rotation of the third counter-shaft gear;

the set of angle detectors further includes a third counter-shaft angle detector adapted to detect a rotation angle of the third counter-shaft;

the third counter-shaft angle detector is adapted to output one cycle of a 1-fold angle detection value $P_{3(1X)}$ of the third counter-shaft per rotation of the third counter-shaft; and the determining the rotation count of the main shaft from the first counter-shaft periodic signal and the second counter-shaft periodic signal further includes:

generating a third counter-shaft periodic signal, which represents a difference in a rotation count of the main shaft and a rotation count of the third counter-shaft from the 1-fold angle detection value $P_{0(1X)}$ of the main shaft and the 1-fold angle detection value $P_{3(1X)}$ of the third counter-shaft, and determining the rotation count of the main shaft from the first counter-shaft periodic signal, the second counter-shaft periodic signal, and the third counter-shaft periodic signal.

8. The multi-turn rotation angle detection method according to claim 7, wherein:

S denotes a number of teeth of the third counter-shaft gear;

when a number of teeth of the second counter-shaft gear is Q=R−1, then S=R+1; and when the number of teeth of the second counter-shaft gear is Q=R+1, then S=R−1.

9. The multi-turn rotation angle detection method according to claim 6, wherein:

the multi-turn rotation angle detection apparatus further comprises:

a third counter-shaft gear; and a third counter-shaft adapted to transmit rotation of the third counter-shaft gear;

the set of angle detectors further includes a third counter-shaft angle detector adapted to detect a rotation angle of the third count-shaft gear;

there is a teeth number difference of 1 between the main shaft gear and the third counter-shaft gear;

the multi-turn rotation angle detection method further comprises:

generating a third counter-shaft periodic signal, which represents a difference in a rotation count of the main shaft and a difference in a rotation count of the third counter-shaft, from the 1-fold angle detection value $P_{0(1X)}$ of the main shaft and a 1-fold angle detection value $P_{3(1X)}$ of the third counter-shaft detected by the third counter-shaft angle detector;

and the determining the rotation count of the main shaft from the first counter-shaft periodic signal and the second counter-shaft periodic signal further includes determining the rotation count of the main shaft from the first counter-shaft periodic signal, the second counter-shaft periodic signal, and the third counter-shaft periodic signal.

10. The multi-turn rotation angle detection method according to claim 6, wherein the discrimination value obtained from the signal $P_{0(((AN)/M)xX)}$ is a remainder obtained by dividing a sum or a difference between the N-fold angle detection value $P_{0(NX)}$ and an N-fold angle detection value $P_{1(NX)}$ of the first counter-shaft by a basic unit quantity u per cycle, where the N-fold angle detection value $P_{1(NX)}$ is calculated as a remainder obtained by-dividing a product of the 1-fold angle detection value $P_{1(1X)}$ of the first counter-shaft and N by the basic unit quantity u, the 1-fold angle detection value $P_{1(1X)}$ being detected by the first counter-shaft angle detector.

11. A multi-turn rotation angle detection apparatus comprising:

a main shaft gear mounted on a main shaft;

a first counter-shaft gear and a second counter-shaft gear adapted to mesh with the main shaft gear;

a first counter-shaft and a second counter-shaft adapted to transmit rotations of the first counter-shaft gear and the second counter-shaft gear, respectively;

a set of angle detectors including (i) a main shaft angle detector adapted to detect a rotation angle of the main shaft, (ii) a first counter-shaft angle detector adapted to detect a rotation angle of the first counter-shaft, and (iii) a second counter-shaft angle detector adapted to detect a rotation angle of the second counter-shaft, where the main shaft angle detector is adapted to output N cycles of an N-fold angle detection value $P_{0(NX)}$ per rotation of the main shaft, the first counter-shaft angle detector is adapted to output one cycle of a 1-fold angle detection value $P_{1(1X)}$ per rotation of the first counter-shaft, and the second counter shaft angle detector is adapted to output one cycle of a 1-fold angle detection value $P_{2(1X)}$ per rotation of the second counter-shaft; and a gear mechanism having a teeth number difference of a two or larger integer A between the first counter-shaft gear and the main shaft gear, and a teeth number difference of 1 between the main shaft gear and the second counter-shaft gear, a number of teeth of the first counter-shaft gear being an integer multiple of a product of the teeth number difference of the two or larger integer A and a shaft angle multiplier N of the main shaft angle detector;

wherein:
a multi-turn absolute rotation angle of the main shaft is determined from rotation angle detection values of the main shaft, the first counter-shaft, and the second counter-shaft;
and
the multi-turn rotation angle detection apparatus further comprises:
  a main shaft rotation angle detection mechanism adapted to (i) determine a signal $P_{0(((AN)/M)xX)}$ one cycle of which corresponds to M/(AN) rotations of the main shaft from the N-fold angle detection value $P_{0(NX)}$ detected by the main shaft angle detector and the 1-fold angle detection value $P_{1(1X)}$ of the first counter-shaft detected by the first counter-shaft angle detector, M being the number of teeth of the first counter-shaft gear, (ii) obtain a discrimination value, which indicates to which cycle of the N cycles the N-fold angle detection value $P_{0(NX)}$ detected by the main shaft angle detector belongs, from the signal $P_{0(((AN)/M)xX)}$, and (iii) synthesize one cycle of a 1-fold angle detection value $P_{0(1X)}$ of the main shaft per rotation of the main shaft from the discrimination value and the N-fold angle detection value $P_{0(NX)}$; and
  a main shaft rotation count detection mechanism adapted to (i) generate a first counter-shaft periodic signal, which represents a difference in a rotation count of the main shaft and a rotation count of first counter-shaft, from the 1-fold angle detection value $P_{0(1X)}$ of the main shaft and the 1-fold angle detection value $P_{1(1X)}$ of the first counter-shaft, (ii) generate a second counter-shaft periodic signal, which represents a difference in the rotation count of the main shaft and a rotation count of the second counter-shaft, from the 1-fold angle detection value $P_{0(1X)}$ of the main shaft and the 1-fold angle detection value $P_{2(1X)}$ of the second counter-shaft detected by the second counter-shaft angle detector, and (iii) determine the rotation count of the main shaft from the first counter-shaft periodic signal and the second counter-shaft periodic signal.

12. The multi-turn rotation angle detection apparatus according to claim 11, wherein:
the gear mechanism further includes a third counter-shaft gear adapted to mesh with the main shaft gear and a third counter-shaft adapted to transmit rotation of the third counter-shaft gear;
the set of angle detectors further includes a third counter-shaft angle detector adapted to detect a rotation angle of the third counter-shaft;
the third counter-shaft angle detector is adapted to output one cycle of a 1-fold angle detection value $P_{3(1X)}$ of the third counter-shaft per rotation of the third counter-shaft; and
the main shaft rotation count detection mechanism is further adapted to (i) generate a third counter-shaft periodic signal, which represents a difference in a rotation count of the main shaft and a rotation count of the third counter-shaft, from the 1-fold angle detection value $P_{0(1X)}$ of the main shaft and the 1-fold angle detection value $P_{3(1X)}$ of the third counter-shaft, and (ii) determine the rotation count of the main shaft from the first counter-shaft periodic signal, the second counter-shaft periodic signal, and the third counter-shaft periodic signal.

13. The multi-turn rotation angle detection apparatus according to claim 12, wherein the discrimination value obtained from the signal $P_{0(((AN)/M)xX)}$ is a remainder obtained by dividing a sum or a difference between the N-fold angle detection value $P_{0(NX)}$ and an N-fold angle detection value $P_{1(NX)}$ of the first counter-shaft by a basic unit quantity u per cycle, where the N-fold angle detection value $P_{1(NX)}$ is calculated as a remainder obtained by dividing a product of the 1-fold angle detection value $P_{1(1X)}$ of the first counter-shaft and N by the basic unit quantity u, the 1-fold angle detection value $P_{1(1X)}$ being detected by the first counter-shaft angle detector.

14. The multi-turn rotation angle detection apparatus according to claim 12, wherein a teeth number difference between the main shaft gear and the third counter-shaft gear is 1.

15. The multi-turn rotation angle detection apparatus according to claim 12, wherein;
S denotes a number of teeth of the third counter-shaft gear;
when a number of teeth of the second counter-shaft gear is Q=R−1, then S=R+1; and
when the number of teeth of the second counter-shaft gear is Q=R+1, then S=R−1.

16. The multi-turn rotation angle detection apparatus according to claim 15, wherein the discrimination value obtained from the signal $P_{0(((AN)/M)xX)}$ is a remainder obtained by dividing a sum or a difference between the N-fold angle detection value $P_{0(NX)}$ and an N-fold angle detection value $P_{1(NX)}$ of the first counter-shaft by a basic unit quantity u per cycle, where the N-fold angle detection value $P_{1(NX)}$ is calculated as a remainder obtained by dividing a product of the 1-fold angle detection value $P_{1(1X)}$ of the first counter-shaft and N by the basic unit quantity u, the 1-fold angle detection value $P_{1(1X)}$ being detected by the first counter-shaft angle detector.

17. The multi-turn rotation angle detection apparatus according to claim 11, wherein:
the gear mechanism further includes a third counter-shaft gear adapted to mesh with the main shaft gear and a third counter-shaft adapted to transmit rotation of the third counter-shaft gear;
a teeth number difference between the main shaft gear and the third counter-shaft gear is 1;
the main shaft rotation count detection mechanism generates a third counter-shaft periodic signal, which represents a difference in a rotation count of the main shaft and a rotation count of the third counter-shaft, is generated from the 1-fold angle detection value $P_{0(1X)}$ of the main shaft and a 1-fold angle detection value $P_{3(1X)}$ of the third counter-shaft detected by a third counter-shaft angle detector; and
the main shaft rotation count detection mechanism determines the rotation count of the main shaft from the first counter-shaft periodic signal, the second counter-shaft periodic signal, and the third counter-shaft periodic signal.

18. The multi-turn rotation angle detection apparatus according to claim 17, wherein:
S denotes a number of teeth of the third counter-shaft gear;
when the number of teeth of the second counter-shaft gear is Q=R−1, then S=R+1; and when the number of teeth of the second counter-shaft gear is Q=R+1, then S=R−1.

19. The multi-turn rotation angle detection apparatus according to claim 17, wherein the discrimination value obtained from the signal $P_{0(((AN)/M)xX)}$ is a remainder obtained by dividing a sum or a difference between the N-fold angle detection value $P_{0(NX)}$ and an N-fold angle detection value $P_{1(NX)}$ of the first counter-shaft by a basic unit quantity u per cycle, where the N-fold angle detection value $P_{1(NX)}$ is calculated as a remainder obtained by dividing a product of the 1-fold angle detection value $P_{1(1X)}$ of the first counter-shaft and N by the basic unit quantity u, the 1-fold angle detection value $P_{1(1X)}$ being detected by the first counter-shaft angle detector.

20. The multi-turn rotation angle detection apparatus according to claim 11, wherein the discrimination value obtained from the signal $P_{0(((AN)/M)xX)}$ is a remainder obtained by dividing a sum or a difference between the N-fold angle detection value $P_{0(NX)}$ and an N-fold angle detection value $P_{1(NX)}$ of the first counter-shaft by a basic unit quantity u per cycle, where the N-fold angle detection value $P_{1(NX)}$ is calculated as a remainder obtained by dividing a product of the 1-fold angle detection value $P_{1(1X)}$ of the first counter-shaft and N by the basic unit quantity u, the 1-fold angle detection value $P_{1(1X)}$ being detected by the first counter-shaft angle detector.

* * * * *